United States Patent Office 3,706,699
Patented Dec. 19, 1972

3,706,699
MANUFACTURE OF MOULDING MATERIAL STARTING FROM POLYETHYLENE TEREPHTHALATE
Andre Jan Conix, Antwerp, and Lambert Gaston Jeurissen, Mortsel, Belgium, assignors to Gevaert-Agfa N.V., Mortsel, Belgium
No Drawing. Continuation of application Ser. No. 739,184, June 24, 1968. This application May 11, 1970, Ser. No. 37,392
Claims priority, application Great Britain, June 29, 1967, 30,140/67
Int. Cl. C08g *51/04*
U.S. Cl. 260—40 R                  24 Claims

ABSTRACT OF THE DISCLOSURE

A process for the preparation of and a novel moulding material comprising polyethylene terephthalate having an inherent viscosity of 0.65 dl./g. measured at 25° C. in a 60:40 mixture of phenol and tetrachloroethane in admixture with from about 0.1 to 10% by weight of a fusible homopolymer and from about 0 to 1% by weight of a finely divided solid mineral substance is described.

---

This application is a continuation of application Ser. No. 739,184 filed June 24, 1968.

On manufacturing photographic film base from polyethylene terephthalate a considerable amount of scrap is always formed. At a later stage this amount is still increased by the scrap which is formed during the subsequent steps of the manufacture of photographic material, for instance during the subbing step, the step of coating the various emulsion layers and the step of cutting in sizes the finished photographic film. Because very great demands are made to the supports for photographic applications, a large part of this scrap, even after elimination of emulsion layers and other layers, is no longer suited for re-use after having been mixed with fresh polyethylene terephthalate, because of colour deterioration and of degradation in molecular weight which has occurred in the scrap material.

On the other hand it was difficult up to now to make use of polyethylene terephthalate as a moulding material. As is generally known it is possible by injection-moulding to manufacture from polyethylene terephthalate amorphous articles having good impact strength. Above the glass transition temperature of about 90° C., however, these articles are not dimensionally stable. In order to obtain articles on the base of polyethylene terephthalates that for practical purposes possess a sufficient dimensional stability and that maintain this dimensional stability at temperatures above the glass transition temperature, the polymer must be crystallized. This crystallization can occur at a temperature between 120 and 240° C. but it is associated with a considerable decrease of impact strength. In addition thereto, the process of crystallization of polyethylene terephthalate occurs too slowly at 140° C., so that the shaped articles have to be kept in the moulds for a relatively long time, which in practice is completely uneconomical.

A method has now been developed according to which a moulding powder can be prepared by starting from polyethylene terephthalate and especially from scrap of polyethylene terephthalate film and by means of which crystalline articles can be obtained that possess a good impact strength and a good dimensional stability.

The method according to the invention for the preparation of moulding material starting from polyethylene terephthalate is characterized thereby that polyethylene terephthalate having an inherent viscosity of at least 0.65 dl./g. (measured at 25° C. in a 60:40 mixture of phenol and tetrachloroethane) is mixed with (A) an amount of 0.1 to 10% by weight of a fusible homopolymer of an $\alpha,\beta$-ethylenically unsaturated organic compound containing an ester group, or 0.1 to 10% by weight of a fusible copolymer of at least two $\alpha,\beta$-ethylenically unsaturated organic compounds of which at least one comprises an ester group, said $\alpha,\beta$-ethylenically unsaturated compound comprising an ester group being an ester of an $\alpha,\beta$-ethylenically unsaturated alcohol and of a saturated carboxylic acid or being an alkylester of an $\alpha,\beta$-ethylenically unsaturated carboxylic acid and in the case of the copolymer constituting at least 10 moles percent of said copolymer and (B) 0 to 1% by weight of a finely divided inert, mineral, solid substance having an average particle size smaller than 10 microns.

A polyethylene terephthalate modified in such a way is very suited for being used as a moulding material.

In order that the moulding material obtained according to the method of the invention should possess the required properties, the molecular weight of the polyethylene terephthalate must be sufficiently high and correspond to an inherent viscosity of at least 0.65 dl./g., preferably of more than 0.85 dl./g. When scrap is used originating from polyethylene terephthalate film or from any other polyethylene terephthalate articles, the molecular weight of the polyester will have decreased during the manipulations it endured, such as its extrusion to film. In most instances its inherent viscosity will be much lower than 0.65 dl./g. so that it is necessary to increase its molecular weight again.

An increasing of the molecular weight can be attained most favourably by a re-polycondensation in solid phase. As is generally known, this solid phase re-polycondensation can be carried out according to different processes, for example by heating powdery polyethylene terephthalate in fluidized form in an inert gas atmosphere at a temperature of about 200° C. or by subjecting powdery or granulate polyethylene terephthalate in a suitable apparatus to a vacuum treatment at high temperatures.

It has been observed that for recovering film scrap this re-polycondensation can be executed successfully in a vacuum tumbling drier, i.e. an apparatus that is normally used for drying polyester granulate before its extrusion. For this purpose the film scrap is brought in the form of chips, sizing at most about 10 sq. cm. preferably about 1 sq. cm. These chips while being agitated are then heated at 200-240° C. for 2 to 20 hours under a vacuum of 0.1 to 5 mm. of Hg. Hereby the inherent viscosity of the polyester chips increases from 0.50-0.60 dl./g. to at least 0.85 dl./g., which corresponds to a considerable increase of molecular weight. The ideal conditions can easily be determined by experiments depending on the form and the size of the apparatus and on the inherent viscosity, the specific surface and the amount of scrap material. These experimental conditions are strongly influenced by the specific surface i.e. by the ratio of surface to volume of the polyethylene terephthalate chips. In order to control the influence of the specific surface on repolycondensation, samples of polyethylene terephthalate chips of different specific surface have been heated at 230° C. under a vacuum of 0.2 mm. Hg for 8 hours. From these tests it appeared to be of advantage that the polyethylene terephthalate have a form possessing a specific surface as high as possible, which is the case for chips originating from film scrap. It is clear, however, that the desired high viscosity can also be obtained when starting from a polyester form having a smaller specific surface, such as occurs in grains.

The high molecular weight polyethylene terephthalate formed in this way is very suited for being worked up to moulding material.

An increasing of the molecular weight of the polyethylene terephthalate can also be obtained by a re-polycondensation in the melt by using a suitable high-vacuum reaction apparatus, such as a multi-shaft reaction screw as is described by R. Erdmenger in Chemie-Ingenieur-Technik, 36, 175–185 (1964). By using this method, film scrap or any other kind of polyethylene terephthalate can be re-polycondensed in the melt to a sufficiently high molecular weight.

By using this re-polycondensation method, the scrap or any other kind of polyethylene terephthalate, preferably can be mixed with the fusible homopolymer or copolymer and occasionally with the inert mineral substance during melting before it is fed to the multi-shaft reaction screw. In doing so, mixing of the polyethylene terephthalate with the polymer and the mineral substance is done before the repolycondensation. After this latter treatment a very homogeneous and high molecular weight material can be obtained directly as moulding granulate, without need to remelt it for mixing. The high molecular weight blend formed in this way is very suited for being worked up to moulding material.

When the inherent viscosity of the available polyethylene terephthalate is higher than 0.65 dl./g., it is not strictly necessary to submit the polyethylene terephthalate to a re-polycondensation process, and in that case it is sufficient to mix it with the fusible homopolymer or copolymer and occasionally with the inert, solid, mineral substance. In the further description will be especially described the working up of polyethylene terephthalate film scrap to moulding material, but the process is applicable to any kind of polyethylene terephthalate as well.

Further, the process according to the invention is characterized thereby that the high molecular weight polyethylene terephthalate having an inherent viscosity of at least 0.65 dl./g. and preferably above 0.85 dl./g. is mixed with an amount of 0.1 to 10% by weight of a fusible homopolymer or copolymer as hereinbefore defined and containing ester groups. This homo- or copolymer has to be homogeneously miscible in the melt with polyethylene terephthalate, and has also to be stable at the temperature at which polyethylene terephthalate is injection-moulded. Polymers which are liable to split off products which promote the degradation of polyethylene terephthalate are unsuitable, for instance polymers comprising chlorine.

The $\alpha,\beta$-ethylenically unsaturated compounds containing an ester group may result from the reaction of an $\alpha,\beta$-ethylenically unsaturated alcohol with a saturated monocarboxylic acid, such as vinyl acetate or isopropenyl acetate. Alkyl esters of an $\alpha,\beta$-ethylenically unsaturated carboxylic acid such ethyl acrylate are also suitable.

Suitable polymers are for instance copoly(ethylene-vinyl acetate), copoly(acrylonitrile-butyl acrylate), copoly(ethylene-ethyl acrylate), copoly(ethyl acrylate-methyl methacrylate), copoly(ethylene-isobutyl acrylate), poly(isobutyl methacrylate) and poly(vinyl stearate).

The process according to this invention is furthermore characterized thereby that the melt of the high molecular weight polyethylene terephthalate and of fusible homopolymer or copolymer is mixed with an amount of 0 to 1% by weight of a finely divided, mineral, inert, solid substance having an average particle size of less than 10μ. For this purpose a lot of substances is considered, but preferably talcum, gypsum, silica, calcium carbonate, alumina, titanium dioxide, dolomite, aluminium silicate, and calcium silicate are used. It is not absolutely necessary to add such a mineral solid substance. For certain applications it suffices to mix the polyethylene terephthalate with the mentioned amounts of fusible homopolymer or copolymer. However, the addition of from 0.1% to 1% by weight of solid matter in extremely finely divided state greatly promotes the required properties of articles which have to be formed from the moulding material.

A very suited method for preparing the moulding material consists therein that as early as during the manufacture of the fusible homopolymer or copolymer such an amount of inert solid substance is added that the desired quantity of solid substance is already present in view of the mixture to be formed later. Doing so, e.g. a polymer can be prepared containing 20% of inert solid substance. By mixing this polymer thereafter with 95% of polyethylene terephthalate the final mixture will contain 1% of inert solid substance.

Mixing of polyethylene terephthalate, fusible homopolymer or copolymer and occasionally solid substance can occur by melting together in an extruder or similar mixing apparatus, whereupon the mixture obtained is transformed by cooling in a form that still can be worked up, such as granules or can be moulded directly so as to form articles of use. These articles of use may comprise directly extruded tubes, other profiled articles as well as articles that are to be moulded from granules later.

In practice the mixture is mostly worked up in a mixing extruder to plates or bars which are then chopped to granules. These granules can be injection-moulded to articles of use.

In some instances it will be interesting to add to the melt in the mixing extruder small quantities of known moulding additives such as a mould release agent, e.g. a low molecular weight polyethylene or wax.

After injection-moulding the temperature of the mould should preferably be maintained for a short while, e.g. for some 10 seconds to 1 minute, above 120° C., preferably at about 140° C., whereby the crystallization of the articles is promoted. As soon as they are crystalline, the articles become dimensionally stable even above the glass transition temperature of polyethylene terephtehalate.

The crystallization behaviour of modified polyethylene terephthalate differs from that of common polyethylene terephthalate so that now also impact-resistant articles are obtained.

It appears clearly during the examination of crystallization on a heated polarisation microscope that by mixing polyethylene terephthalate with fusible homopolymer or copolymer and occasionally with an inert filler a thorough modification of crystallization behavior takes place. Indeed, when a sample of non-modified polyethylene terephthalate is melted at 280° C. and then cooled to 180° C. within about 5 minutes, large spherulites (20–30μ) are visible in the polarisation microscope. These relatively large sizes of spherulities contribute to the brittleness of crystallized non-modified polyethylene terephthalate.

When, however, a sample of modified polyethylene terephthalate according to the present invention is treated in the same way the spherulites are numerous and small, viz of the order of magnitude of 1μ, and even less. This is probably the cause of the higher impact strength of the articles manufactured from polyethylene terephthalate modified according to this method described herein.

A further advantage of the modified polyethylene terephthalate is the very high crystallization speed compared to that of non-modified polyethylene terephthalate, so that crystallization may occur in the mould within a period of time that is acceptable for practical purposes.

It is self-evident that the polyethylene terephthalate during its working up as moulding powder may also be mixed with glass fibers as reinforcing material, whereby an especially high impact strength is obtained.

In the following examples the inherent viscosity $\eta_{inh}$, which is a measure of the degree of polycondensation, was calculated from the equation $$\eta_{inh} = \frac{\ln \eta_{rel}}{c}$$

wherein $\eta_{rel}$ (the relative viscosity) was found from $$\eta_{rel} = \frac{\text{flow time of solution}}{\text{flow time of solvent}}$$

and wherein $c$ is the concentration.

For polyethylene terephthalate $\eta_{rel}$ was determined at 25° C. for a solution having a concentration of 0.5 g. of polyester per 100 ccs. of 60:40 mixture of phenol and sym. tetrachloroethane.

In the following examples the homopolymers or copolymers containing ester groups are characterized by their melt index which is an indication of the melt viscosity of the homopolymers or copolymers. The melt index is the number of grams of polymer flowing through a standard orifice in a given time at a standard temperature and under standard pressure. The measurements occurred according to ASTM Standard D 1238–62 T.

The following examples illustrate the present invention.

EXAMPLE 1

In a tumbling drier 47.5 kg. of polyethylene terephthalate film cuttings obtained by chopping film scrap into pieces of about 1 sq. cm. were heated for 8 hours at 220° C. under a pressure of 0.5 mm. of Hg. Thereby the inherent viscosity of 0.57 dl./g. increased to 0.95 dl./g.

These cuttings were then mixed in the tumbling drier with 2.25 kg. of granulate of a copoly(ethylene-vinyl acetate) comprising 82 moles percent of ethylene and 18 moles percent of vinyl acetate and having a melt index of 25. The corresponding inherent viscosity, determined at 30° C. in a 0.25% concentration in toluene, amounted to 0.78 dl./g.

There was also added 0.25 kg. of finely divided talcum having an average particle size below $3\mu$. Thus the final mixture contained 4.5% by weight of copolymer and 0.5% by weight of talcum. This mixture was homogenized by melting it in a mixing extruder, whereupon it was extruded to plates. After chopping of the cooled plates to granules, an injection-apparatus having heatable moulds was fed therewith. By keeping the moulds at about 140° C. during injection-moulding and by maintaining it at that temperature for some further 30 seconds moulded articles were obtained having an excellent impact strength and toughness.

EXAMPLE 2

Polyethylene terephthalate having an inherent viscosity of 0.65 dl./g. was dried for 4 hours in a tumbling drier at 150° C. under a pressure of 0.5 mm. Hg. Then copoly (acrylonitrilebutyl acrylate) comprising 11 moles percent of acrylonitrile and 89 moles percent of butyl acrylate was added together with an amount of talcum powder having an average particle size smaller than $3\mu$. The amounts of copolymer and of talcum were determined such that the final mixture contained 4% by weight of copolymer and 1% by weight of talcum.

The mixture was fed in a mixing extruder, homogenized therein and moulded to plates. The further manipulation occurred as in Example 1. Here too, injection-moulded articles were obtained possessing excellent impact strength and toughness.

EXAMPLE 3

Polyethylene terephthalate film cuttings, obtained as described in Example 1, and having an inherent viscosity of 0.95 dl./g., were mixed with copoly(ethylene-ethyl acrylate), comprising 87 moles percent of ethylene and 13 moles percent of ethyl acrylate and having a melt index of 2.5, and further with alumina of an average particle size smaller than $5\mu$. The amounts of copolymer and of alumina were such that the final mixture contained 3% by weight of copolymer and 0.7% by weight of alumina. The further manipulations occurred as in Example 1. Injection-moulded articles were obtained having excellent impact strength and toughness.

EXAMPLE 4

The procedure of Example 3 was repeated, excepted that instead of copoly(ethylene-ethyl acrylate) a same amount of copoly(ethylene-isobutyl acrylate) was used. All manipulations were the same as in Example 1 and here too, injection-moulded articles were obtained showing excellent impact strength and toughness.

EXAMPLE 5

The process of Example 1 was repeated. To the polyethylene terephthalate film cuttings having an increased inherent viscosity of 0.95 dl./g. were added in the tumbling drier 0.5% by weight of a copoly(ethylene-ethyl acrylate) comprising 80 moles percent of ethylene and 20 moles percent of ethyl acrylate and having a melt index of 22. Further were added 0.1% by weight of talcum powder having an average particle size below $3\mu$ and as a mould release agent 0.1% by weight of low molecular weight polyethylene having a melt index of 22. All percentages given above were calculated on the weight of the polyethylene terephthalate present. The mixture was further treated as in Example 1. Moulded articles were obtained having excellent impact strength and toughness.

EXAMPLE 6

Polyethylene terephthalate film cuttings having an inherent viscosity of 0.5 dl./g. were mixed with 1% by weight of a copoly(ethylene-ethyl acrylate) comprising 90 moles percent of ethylene and 10 moles percent of ethyl acrylate and possessing a melt index of 25. Further were added 0.2 percent by weight of talcum powder having a particle size below $5\mu$, and as a mould release agent 0.1% by weight of polyethylene having a melt index of 22. All percentages given above were calculated on the weight of the polyethylene terephthalate present. The whole was mixed in a mixing extruder and then fed into a two-shaft reaction screw apparatus for re-polycondensation, wherein it was treated until the intrinsic viscosity of the polyethylene terephthalate had reached 1.0 dl./g. Upon leaving the two-shaft reaction screw apparatus the mixture was cooled and chopped to granules. These were fed to an injection-apparatus having heatable moulds. By keeping the moulds at 140° C. during injection-moulding and by maintaining it at that temperature for about 30 seconds moulded articles were obtained having excellent impact strength and toughness.

It is claimed:

1. Process for the preparation of moulding material starting from polyethylene terephthalate, characterized in that polyethylene terephthalate having an inherent viscosity of at least 0.65 dl./g. measured at 25° C. in a 60:40 mixture of phenol and tetrachloroethane is mixed with (A) an amount of 0.1 to 10 percent by weight of a fusible homopolymer of an $\alpha,\beta$-ethylenically unsaturated organic compound containing an ester group, or of 0.1 to 10 percen by weight of a fusible co-polymer of at least two $\alpha,\beta$-ethylenically unsaturated organic compounds of which at least one comprises an ester group, said $\alpha,\beta$-ethylenically unsaturated compound comprising an ester group being an ester of an $\alpha,\beta$-ethylenically unsaturated alcohol and of a saturated carboxylic acid or being an alkyl-ester of an $\alpha,\beta$-ethylenically unsaturated carboxylic acid and in the case of the co-polymer constituting at least 10 moles percent of said co-polymer and (B) 0 to 1 percent by weight of a finely divided, inert, mineral, solid substance having an average particle size smaller than 10 microns.

2. Process according to claim 1 wherein the polyethylene terephthalate possesses an inherent viscosity of at least 0.85 dl./g.

3. Process according to claim 1 wherein the polyethylene terephthalate used has been subjected to a repolycondensation reaction until an inherent viscosity of at least 0.65 dl./g. is obtained.

4. Process according to claim 3 wherein repolycondensation reaction is a solid phase polycondensation reaction.

5. Process according to claim 4 wherein the polyethylene terephthalate used is polyethylene terephthalate film scrap which has been subjected to a solid phase polycondensation until an inherent viscosity of at least 0.65 dl./g. is obtained.

6. Process according to claim 4 wherein the polyethylene terephthalate film scrap cut into chips of at most 10 square centimeters, preferably of about 1 square centimeter, is subjected to a solid phase polycondensation for 2 to 20 hours at a temperature comprised between 200 and 240° C., and under a pressure of 0.1 to 5 mm. of Hg.

7. Process according to claim 3 wherein the repolycondensation reaction is executed in the melt in a high-vacuum multi-shaft reaction screw.

8. Process according to claim 1 wherein the polymer added to polyethylene terephthalate is a co-polymer of ethylene and vinyl acetate.

9. Process according to claim 1 wherein the polymer added to polyethylene terephthalate is a co-polymer of acrylonitrile and butyl acrylate.

10. Process according to claim 1 wherein the polymer added to polyethylene terephthalate is a co-polymer of ethylene and ethyl acrylate.

11. Process according to claim 1 wherein the polymer added to polyethylene terephthalate is a co-polymer of ethylene and isobutyl acrylate.

12. Process according to claim 1 wherein the polyethylene terephthalate is mixed with from 0.1 to 1 percent by weight of a finely divided, inert, mineral, solid substance.

13. Process according to claim 12 wherein the finely divided, inert, mineral, solid substance is talcum.

14. Process according to claim 12 wherein the finely divided, inert, mineral, solid substance is alumina.

15. Process according to claim 1 wherein the fusible homo-polymer or co-polymer and the mineral solid substance is mixed with the polyethylene terephthalate before the repolycondensation in the melt in a high-vacuum, multi-shaft reaction screw.

16. A moulding material comprising an admixture of (A) polyethylene terephthalate having an inherent viscosity of at least 0.65 dl./g. measured at 25° C., in a 60:40 mixture of phenol and tetrachloroethane, (B) from about 0.1 to 10 percent by weight of a fusible homopolymer of an α,β-ethylenically unsaturated organic compound containing an ester group, or from about 0.1 to 10 percent by weight of a fusible co-polymer of at least two α,β-ethylenically unsaturated organic compounds of which at least one comprises an ester group, said α,β-ethylenically unsaturated compound comprising an ester group being an ester of an α,β-ethylenically unsaturated alcohol and of a saturated carboxylic acid or being an alkyl-ester of an α,β-ethylenically unsaturated carboxylic acid and in the case of the co-polymer constituting at least 10 moles percent of said co-polymer; and (C) from about 0 to 1 percent by weight of a finely divided, inert, mineral, solid substance having an average particle size smaller than 10 microns.

17. A moulding material according to claim 16 wherein the polyethylene terephthalate possesses an inherent viscosity of at least 0.85 dl./g.

18. A moulding material according to claim 16 wherein the polymer added to polyethylene terephthalate is a co-polymer of ethylene and vinyl acetate.

19. A moulding material according to claim 16 wherein the polymer added to polyethylene terephthalate is a co-polymer of acrylonitrile and butyl acrylate.

20. A moulding material according to claim 16 wherein the polymer added to polyethylene terephthalate is a co-polymer of ethylene and ethyl acrylate.

21. A moulding material according to claim 16 wherein the polymer added to polyethylene terephthalate is a co-polymer of ethylene and isobutyl acrylate.

22. A moulding material according to claim 24 wherein the finely divided, inert, mineral, solid substance is talcum.

23. A moulding material according to claim 24 wherein the finely divided, inert, mineral, solid substance is alumina.

24. The moulding material according to claim 16 wherein (C) is present at from 0.1 to 1 percent by weight.

References Cited

UNITED STATES PATENTS

| | | | |
|---|---|---|---|
| 3,290,411 | 12/1966 | Tsuji et al. | 260—873 |
| 3,361,848 | 1/1968 | Siggel et al. | 260—873 |
| 3,562,200 | 2/1971 | Jones et al. | 260—873 |

FOREIGN PATENTS

| | | | |
|---|---|---|---|
| 1,172,186 | 11/1969 | Great Britain | 260—873 |
| 1,194,704 | 6/1970 | Great Britain | 260—873 |
| 1,104,089 | 2/1968 | Great Britain | 260—40 |

LEWIS T. JACOBS, Primary Examiner

U.S. Cl. X.R.

260—873